(12) United States Patent
Fasciani et al.

(10) Patent No.: US 8,126,700 B2
(45) Date of Patent: Feb. 28, 2012

(54) COMPUTER-ASSISTED COMPREHENSION OF TEXTS

(75) Inventors: Dante Fasciani, Paganica (IT); Giulio Maltese, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 11/692,388

(22) Filed: Mar. 28, 2007

(65) Prior Publication Data

US 2007/0233461 A1    Oct. 4, 2007

(30) Foreign Application Priority Data

Mar. 29, 2006 (EP) .................................. 06111871

(51) Int. Cl.
    *G06F 17/28* (2006.01)
(52) U.S. Cl. .......... 704/4; 704/2; 704/3; 704/5; 434/157
(58) Field of Classification Search ................ 704/1–10; 434/157–178
    See application file for complete search history.

(56) References Cited

U.S. PATENT DOCUMENTS

| | | | | |
|---|---|---|---|---|
| 5,517,409 A * | 5/1996 | Ozawa et al. | | 704/3 |
| 6,272,456 B1 * | 8/2001 | de Campos | | 704/8 |
| 6,393,389 B1 * | 5/2002 | Chanod et al. | | 704/7 |
| 6,735,559 B1 * | 5/2004 | Takazawa | | 704/7 |
| 7,107,204 B1 * | 9/2006 | Liu et al. | | 704/2 |
| 7,664,629 B2 * | 2/2010 | Dymetman et al. | | 704/4 |
| 2002/0052730 A1 * | 5/2002 | Nakao | | 704/10 |
| 2003/0046057 A1 * | 3/2003 | Okunishi et al. | | 704/1 |
| 2003/0149557 A1 * | 8/2003 | Cox et al. | | 704/2 |
| 2003/0236659 A1 * | 12/2003 | Castellanos | | 704/4 |
| 2004/0083224 A1 * | 4/2004 | Yoshida | | 707/100 |
| 2004/0138872 A1 * | 7/2004 | Nir | | 704/10 |
| 2006/0217961 A1 * | 9/2006 | Masuichi et al. | | 704/3 |
| 2007/0033002 A1 * | 2/2007 | Dymetman et al. | | 704/5 |

OTHER PUBLICATIONS

Li et al. "Using bilingual web data to mine and rank translatons," IEEE intelligent Systems, pp. 54-59, Published: Jul. 2003.*
Zheng, "StarDict manual", version 2.4.2, [online], http://stardict.sourceforge.net. User manual of StarDict, a free electronic dictionary software, published 2003, retrieved from http://www.archive.org, archiving date: Jan. 15, 2005.*

* cited by examiner

*Primary Examiner* — James S. Wozniak
*Assistant Examiner* — Jialong He
(74) *Attorney, Agent, or Firm* — DeLizio Gilliam, PLLC

(57) ABSTRACT

A solution is proposed for the data-handling system-assisted comprehension of texts (particularly, when they are written in a foreign language). For this purpose, a difficulty index is associated with each known word (for example, according to its frequency of use in standard texts). The words of a current document opened using the data-handling system are sorted according to their difficulty indexes. The words having the difficulty indexes higher than a threshold value (for example, based on the skill of a reader) are selected as difficult. A translation of each difficult word is then extracted from a dictionary; this translation is displayed close to each occurrence of the corresponding difficult word.

16 Claims, 5 Drawing Sheets

COMPUTER-ASSISTED COMPREHENSION OF TEXTS

CROSS-REFERENCE TO RELATED APPLICATIONS AND CLAIM OF PRIORITY

This application claims the benefit of priority of French Patent Application No. 06111871.7 filed on Mar. 29, 2006, and entitled "METHOD, SYSTEM AND COMPUTER PROGRAM FOR COMPUTER-ASSISTED COMPREHENSION OF TEXTS" hereby incorporated by reference herein for all purposes.

BACKGROUND

1. Technical Field

Embodiments of the present invention relate to the information technology field. More specifically, such embodiments of the invention relate to computer-assisted comprehension of texts by a user of a data processing system.

2. Description of Related Art

The comprehension of texts is not always an easy task. For example, this may be particularly difficult for complex texts, especially when they relate to very specialist fields (such as technical papers). The problem is more acute when the text is written in a foreign language (which a reader of the text does not know perfectly).

In order to mitigate this problem, a number of tools are available to assist the reader in translating the text into his/her native language. For example, on-line dictionaries are commonly used to look up the words that are not known to the reader. However, the operation of retrieving the translation of each desired word from the dictionary is very time consuming. Moreover, the reader must continually interrupt the reading of the text; therefore, s/he is diverted by those repeated changes (between the text and the dictionary). This has a detrimental impact on the concentration of the reader, and then on the comprehension of the text.

Automatic translation tools are also known in the art. Those tools are based on software programs, which translate the text in a different language without any human intervention. The automatic translation tools available on the market exploit a number of different algorithms. For example, the simplest solution consists of replacing each word of the text with its translation. More sophisticated solutions perform a linguistic analysis of the text, in an attempt to decode its actual meaning; for example, this cognitive process is based on lexical, grammar or semantic rules. The above-mentioned linguistic rules may be applied according to different approaches; for example, the automatic translation tools can exploit heuristic, statistical or analogy methods.

The same techniques are also used by services that provide an instant translation of online texts. Those instant translation services have become very popular in the Internet; typical applications of the instant translation services relate to web pages, e-mail, and chats (for example, in e-commerce sites).

In any case, the result of the automatic translation tools currently available is very poor. Indeed, the meaning of any text is heavily dependent on its context. However, it is very difficult (if not impossible) to provide significant information about the context of the text to the automatic translation tools; moreover, the use of this information by the automatic translation tools is not trivial. As a result, the automatic translation tools are commonly used in specific and well-understood situations only; in any case, the obtained results always require a post-editing intervention by a human translator.

Therefore, the automatic translation tools are at best useful to provide the raw meaning of the argument of the (original) text. In any case, they are completely unable to convey the complete understanding of the text. The solution is then untenable in most practical situations (for example, when an accurate comprehension of the text is required).

BRIEF SUMMARY

A system, method, and computer program product for facilitating computer-assisted comprehension of texts by a user of a data processing system are disclosed. In one embodiment, a method is provided which comprises providing a digital representation of a text, the text including at least one occurrence of each one of a plurality of expressions, associating each expression with a difficulty index indicative of a corresponding comprehension difficulty, selecting a set of the expressions according to a comparison of the corresponding difficulty indexes with a threshold value, associating each selected expression with a corresponding explanation, and outputting at least part of the text with an indication of the explanation of each corresponding selected expression.

BRIEF DESCRIPTION OF THE DRAWINGS

Embodiments of the present invention, as well as further features and advantages thereof, will be best understood with reference to the following detailed description, given purely by way of a nonrestrictive indication, to be read in conjunction with the accompanying drawings, in which.

DETAILED DESCRIPTION OF AN ILLUSTRATIVE EMBODIMENT

In its general form, embodiments of the present invention are based on the idea of providing an explanation of the most difficult expressions only.

Particularly, embodiments of the present invention provide a solution as set out in the independent claims. More in detail, embodiments of the invention propose a method for facilitating computer-assisted comprehension of texts by a user of a data processing system. The method starts with the step of providing a digital representation of a text; the text includes one or more occurrences of each one of a plurality of expressions (such as words). Each expression is associated with a difficulty index, which is indicative of a corresponding comprehension difficulty. A set of the expressions is then selected according to a comparison of the corresponding difficulty indexes with a threshold value. The method continues by associating each selected expression with a corresponding explanation. The text (or a part thereof) is now output with an indication of the explanation of each corresponding selected expression.

In one embodiment of the invention, the difficulty index of each expression is determined according to its frequency of use. For this purpose, it is possible to calculate a percentage of the occurrences of the expressions in predefined sample texts. As a further enhancement, the frequency of use of the expression is updated according to the percentage of its occurrences in the current text. Typically, the explanation of each (difficult) expression is displayed close to each occurrence thereof.

A way to further improve the solution is to allow the selection of further expressions (so as to add the corresponding explanation to the text); at the same time, the difficulty index of the selected expression is increased accordingly. Conversely, it is possible to deselect a difficult expression; in this case, the difficulty index of the deselected expression is decreased accordingly. Typically, the proposed solution finds application in the translation of the difficult expressions in a different language.

Figure 1:
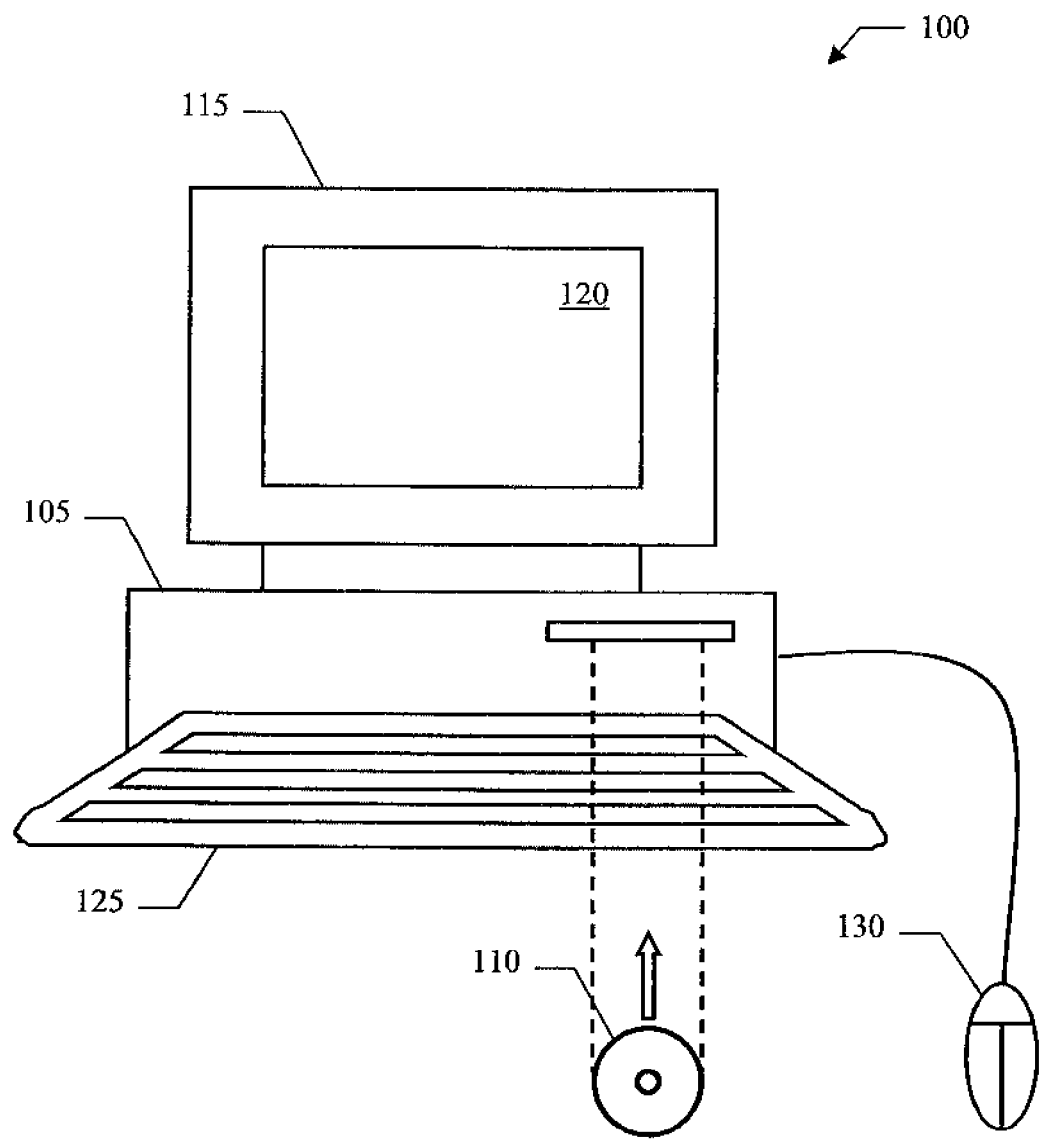
FIG. 1 is a pictorial representation of a computer that can be used to practice the solution according to an embodiment of the invention.

With reference in particular to FIG. 1, a computer 100 (for example, a PC) is illustrated. The computer 100 includes a central unit 105, which houses the electronic circuits controlling its operation (such as a microprocessor and a working memory). The computer 100 is also provided with a hard-disk and a drive for reading CD-ROMs 110. A monitor 115 is used to display images on a screen 120. Operation of the computer 100 is controlled by means of a keyboard 125 and a mouse 130, which are connected to the central unit 105 in a conventional manner.

Figure 2:
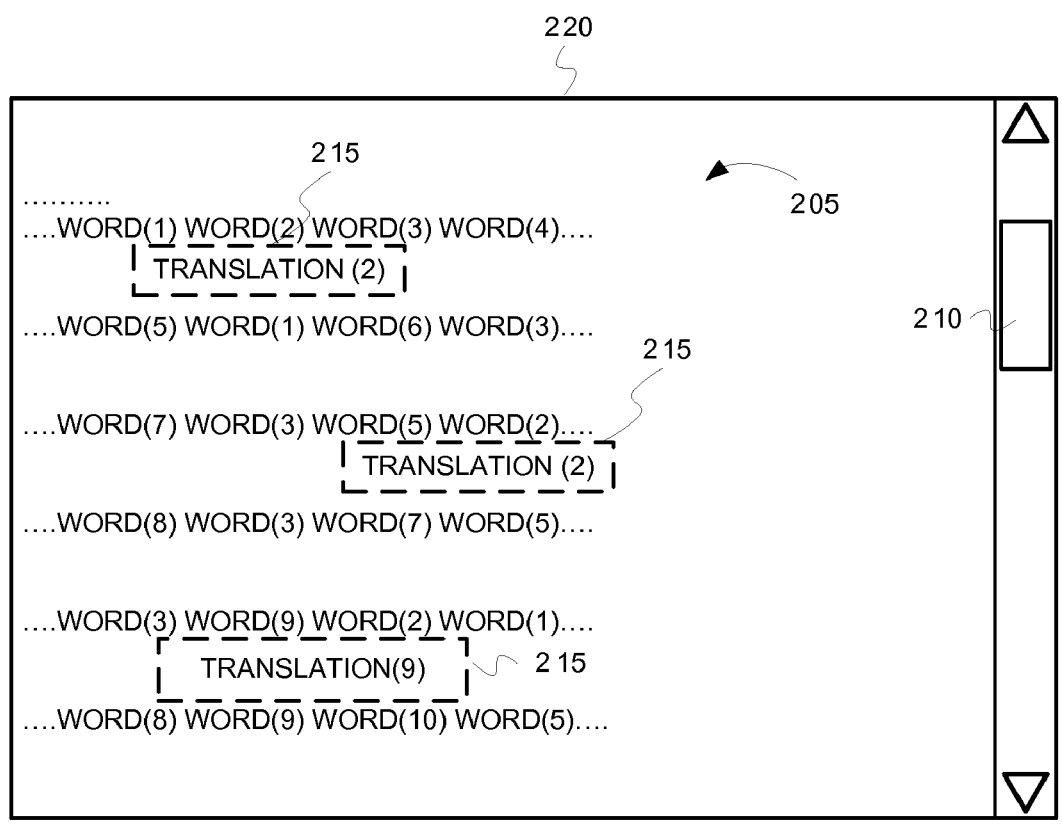
FIGS. 2, 3a-3b and 4a-4b illustrate exemplary applications of the solution according to different embodiments of the invention.

As shown in FIG. 2, in the example at issue the computer is used to read a document 205 on the screen 120. The document 205 consists of a collection of information arranged in a specific layout; the document 205 may include information in different formats (such as text, drawings, pictures, graphs, and the like). Typically, only a portion of the whole document 205 (i.e., a page) is displayed on the screen 120 according to its size. A scroll-bar 210 is used to slide the document 205 (such as vertically) for its complete reading.

Considering in particular the text of the document 205, it consists of a sequence of sentences each one formed by a group of words (with one or more occurrences of the same words that can be repeated in the text). Each word "word(i)" represents a meaningful unit (such as a noun, an adjective, a verb, an adverb, and the like) of a specific language (for example, English).

As described in detail in the following, the solution according to an embodiment of the invention is based on the observation that a reader generally understands most of the text, while s/he does not know the meaning of a few words only. Therefore, it is possible to select the most difficult words of the text (for example, according to their frequency of use); an explanation of those difficult words (for example, their translation in another language, such as Italian) is then displayed close to each occurrence thereof. Particularly, in the example at issue the difficult words are "word(2)" and "word(9)". In this case, their translations (denoted with "translation(2)" and "translation(9)", respectively) are shown on the screen 120; particularly, each translation is arranged in a box 215, which is placed close to each occurrence of the corresponding difficult word (two for "word(2)" and one for "word(9)").

The proposed solution provides the translations allegedly required by the reader automatically (without any manual operation). Therefore, the reading of the text must not be interrupted; this has a beneficial impact on the concentration of the reader (and then on his/her comprehension of the text).

Moreover, the reader always accesses the document 205 in its original form; this prevents all the problems caused by the intrinsic inaccuracy of the automatic translation tools.

In any case, it is emphasized that the solution described above only outputs the information that is actually needed to the reader; in other words, the solution is substantially opaque to the reading of the text (as far as it can be already understood); conversely, it intervenes only for the few words that the reader is likely not to know.

Figure 3A:
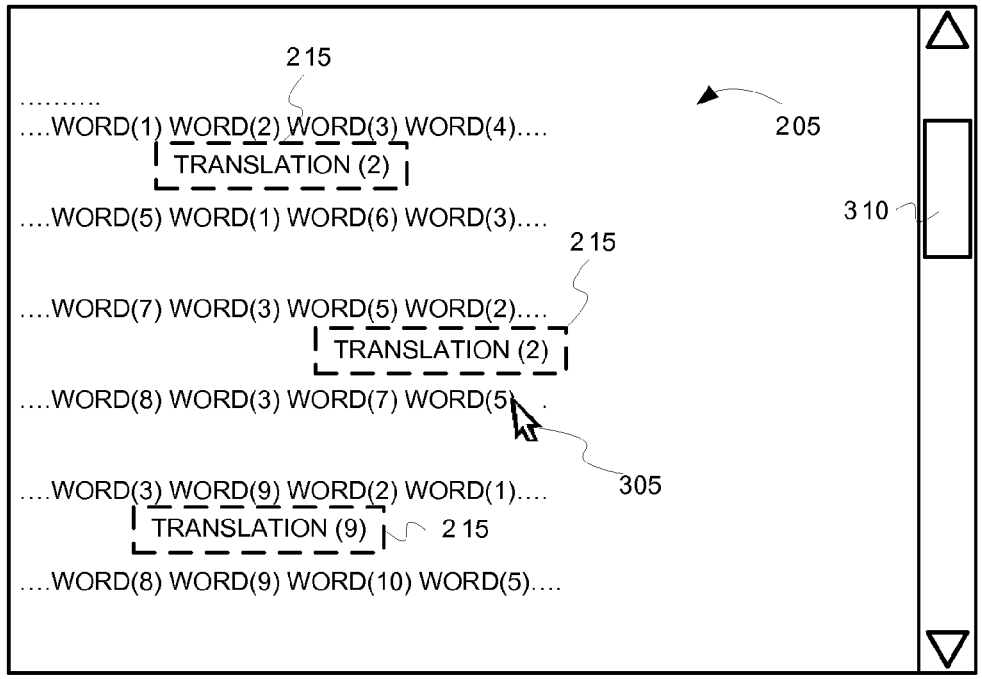

Moving now to FIG. 3a, it is possible that the reader does not understand other words of the document 205 that have not been translated. In this case, the reader can select one of those words manually; for example, it is possible to move a pointer 305 over an occurrence of the desired word and then double-click with the mouse (such as over "word(5)" on the fifth row of the page).

Figure 3B:
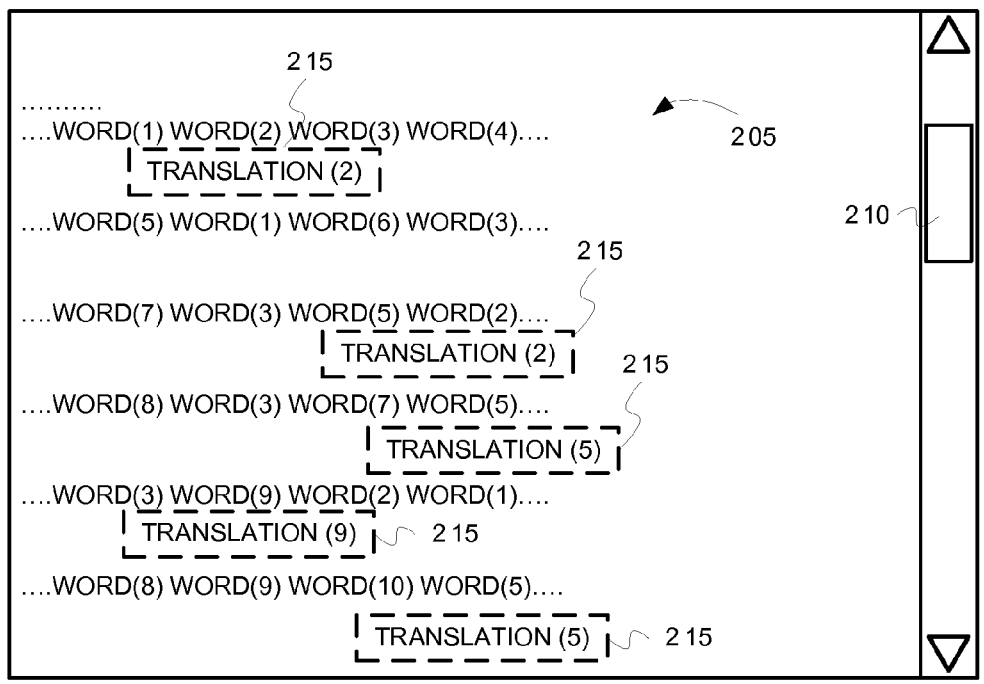

In response thereto, as shown in FIG. 3b, the translation of this selected word is added to the text; as above, the translation is arranged in a further box 215, which is placed close to each occurrence of the corresponding word (two for "word (5)" in the example at issue). At the same time, the difficulty of the selected word is increased, so as to have it translated automatically at further reading of the same or any other document. This additional feature allows tuning the proposed solution to the actual skill of the reader.

Figure 4A:
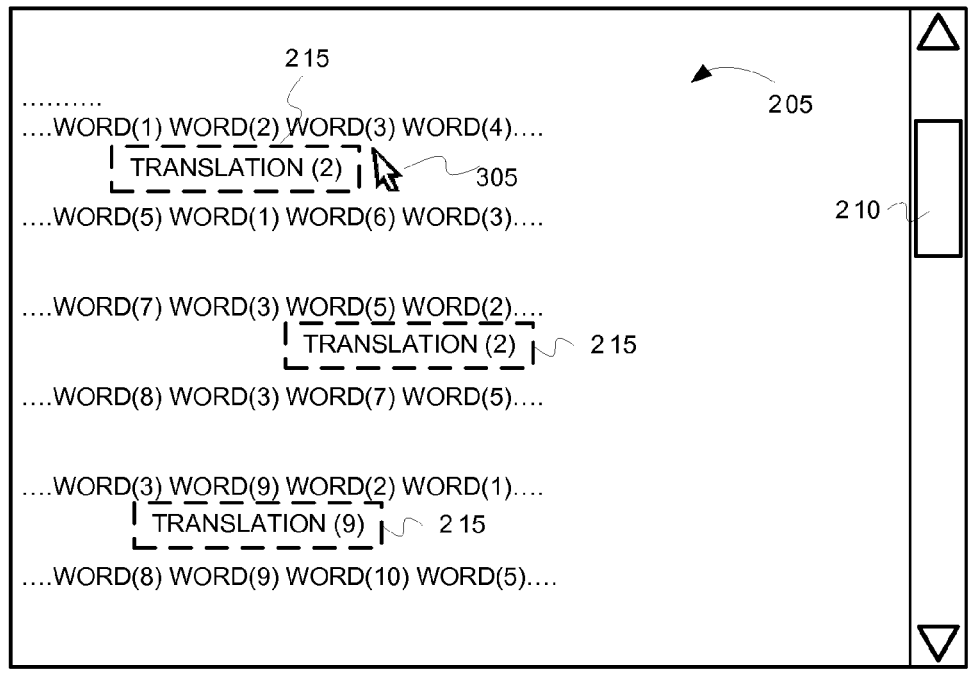

With reference now to FIG. 4a, on the contrary the reader can already know the meaning of some of the words that have been translated. In this case, the reader can select one of the corresponding translations manually; for example, it is again possible to move the pointer 305 over the corresponding box 215 and then double-click with the mouse (such as over "translation(2)" on the second row of the page).

Figure 4B:
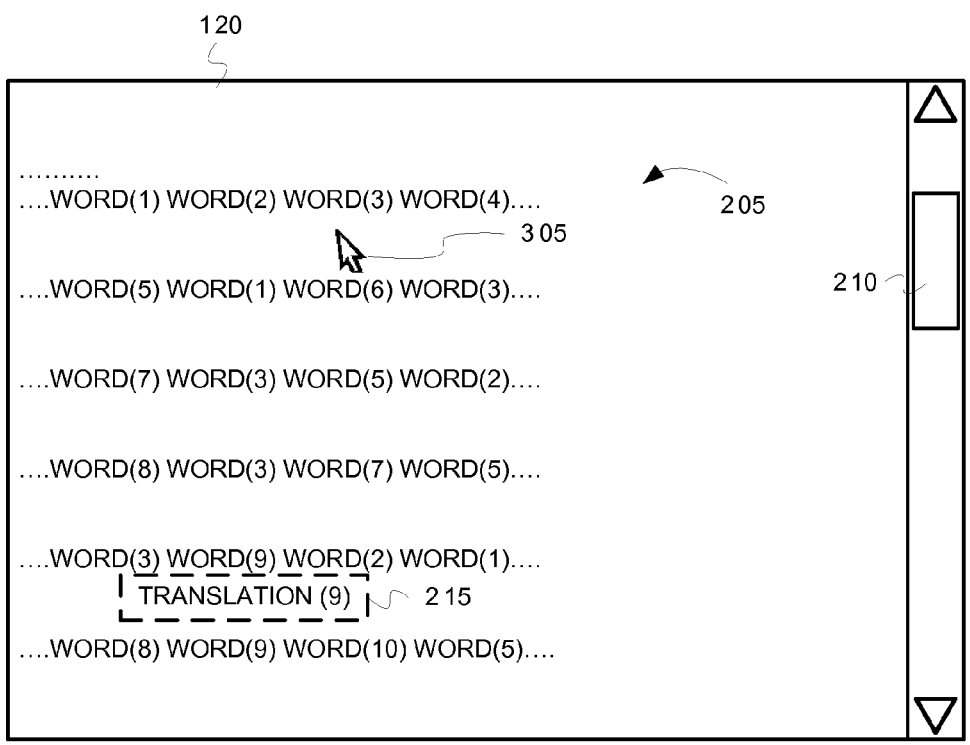

In response thereto, as shown in FIG. 4b, this selected translation is removed from the screen 120; particularly, there are closed all the boxes containing the selected translation, associated with the different occurrences of the corresponding difficult word (two for "translation(2)" in the example at issue). At the same time, the difficulty of the word associated with the selected translation is reduced, so as to avoid its translation at further reading of the same or any other document. In this way, the display of the document 205 becomes simpler and simpler as the reader learns the meaning of its words (with the help of the proposed solution).

Figure 5:
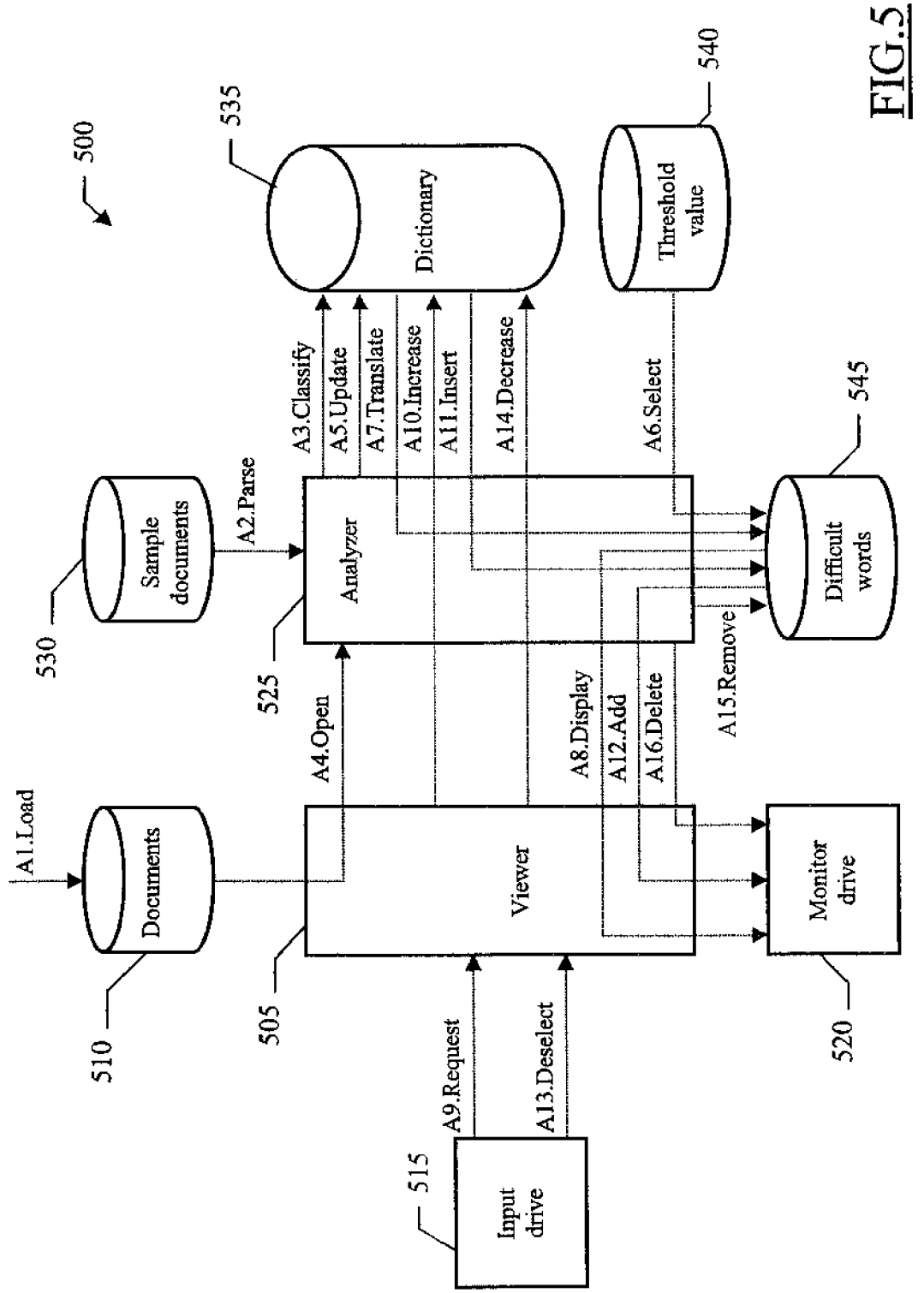
FIG. 5 is a collaboration diagram representing the roles of different software modules implementing the solution according to an embodiment of the invention.

Moving to FIG. 5, the main software modules that run on the above-described computer are denoted as a whole with the reference 500. The information (programs and data) is typically stored on the hard-disk and loaded (at least partially) into the working memory of the computer when the programs are running. The programs are initially installed onto the hard disk, for example, from CD-ROM. Particularly, the figure describes the static structure of the system (by means of the corresponding modules) and its dynamic behavior (by means of a series of exchanged messages, which are denoted with progressive sequence numbers preceded by the letter "A").

Particularly, the computer runs a viewer 505 (for example, a word processor, a reader, and the like). The viewer 505 is used to read generic documents 510 (such as letters, articles, e-books, presentations, and the like). The reader interacts with the viewer 505 through (input) drives of the mouse and the keyboard (denoted as a whole with 515); on the other hand, the viewer 505 controls the monitor of the computer by means of a corresponding drive 520.

The viewer 505 is provided with a (plug-in) analyzer 525, which implements the above-described solution. For this purpose, the analyzer 525 accesses a set of (standard) sample documents 530; for example, the sample documents 530 consist of a general-purpose encyclopedia. The analyzer 525 parses the sample documents 530 (action A2), so as to calculate the frequency of use of each known word defined in a dictionary 535 (for example, defined by their percentage over the whole content of the sample documents 530). The frequency of each word provides an estimate of its comprehension difficulty (based on the assumption that the more rarely the words are used the more difficult to understand they are); a corresponding difficulty index is set accordingly (for example, to the complement to 100% of the above-mentioned percentage) and then associated with the word in the dictionary 535 (action A3). In this way, each reader can initialize the dictionary 535 according to his/her specific requirements. For example, it is possible to exploit different sample documents 530 for a number of contexts (such as standard, technical, legal or prose texts).

Whenever the reader decides to open a specific document 510 (action 4), the viewer 505 notifies the analyzer 525 accordingly. In response thereto, the analyzer 525 likewise parses the current document 510, so as to calculate the (local) frequency of use of each known word thereof defined in the same dictionary 535. This information is used to update the difficulty indexes of these words in the dictionary 535 (action A5); for example, it is possible to increase or decrease each frequency according to a percentage (such as 1-5%) of its local value. As a result, the proposed solution self-adapts to the actual content of the documents 510; in any case this result is achieved with a slow dynamic, which filters out any sharp changes due to documents 510 that are very short and/or about specialist arguments.

The analyzer 525 then sorts the words included in the current document 510 according to their difficulty indexes (as defined in the dictionary 535); the words having the difficulty indexes higher than a threshold value stored in a corresponding table 540 are selected as difficult. Preferably, the threshold value 540 can be customized by the reader according to his/her skill (for example, from 20-30% for a beginner to 1-2% for an expert). Those difficult words are saved into a corresponding lookup table 545 (action A6). The analyzer 525 then translates the difficult words in the table 545 (word by word) looking up their explanation in the dictionary 535. The translations so obtained are added to the corresponding entries in the difficult word table 545 (action A7). The viewer 505 accesses the difficult word table 545; in this way, the viewer 505 can display any desired page of the current document 510 with the addition of the translation of each occurrence of the difficult words included in this page (action A8). The same operation is repeated for any new page of the current document 501 that is accessed.

In a completely asynchronous manner, the reader can select an additional word (which s/he does not known) in the current page; the event is notified by the input drive 515 to the viewer 505 (action A9). In response thereto, the analyzer 525 is instructed to increase the difficulty index of the selected word (action 10); for example, the difficulty index is brought just above the threshold value 540. In this way, the selected word will be translated automatically at a further opening of the same or any other document 510. Moreover, the analyzer 525 inserts the selected word with its translation (extracted from the dictionary 535) into the difficult word table 545 (action A11); concurrently, the viewer 505 adds the translation to all the occurrences of the selected word in the current page (action A12).

Conversely, the reader can select a translation (which s/he already knows) in the current page; the event is likewise notified by the input drive 515 to the viewer 505 (action A13). In response thereto, the analyzer 525 is now instructed to decrease the difficulty index of the word associated with the selected translation (action 14); for example, the difficulty index is brought just below the threshold value 540. In this way, the same word will not be translated any longer at a further opening of the same or any other document 510. Moreover, that (deselected) word is removed from the difficult word table 545 (action A15); concurrently, the viewer 505 deletes the selected translation for all the occurrences of the corresponding word in the current page (action A16).

Naturally, in order to satisfy local and specific requirements, a person skilled in the art may apply to the solution described above many modifications and alterations. Particularly, although embodiments of the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has a different structure or includes equivalent units (such as cache memories temporarily storing the programs or parts thereof to reduce the accesses to the mass memory during execution); in any case, it is possible to replace the computer with any code execution entity (such as a PDA, a mobile phone, and the like).

Moreover, it is expressly intended that the term word as used herein must not be interpreted in its strict sense; indeed, the translation may also be applied to idioms, phrases, or more generally to any other expressions. Likewise, it is possible to replace the difficulty indexes with whatever indicator of how difficult (or easy) the comprehension of the words is.

Moreover, the translation associated with each difficult word may consist of a list of words (or more generally expressions) explaining the possible meanings of the difficult word; it also possible to display the whole list or a part thereof only in the corresponding box.

It should be readily apparent that the proposed algorithm for calculating the difficulty indexes according to the frequency of use of the words must not to be interpreted in a limitative manner. For example, it is possible to exploit more sophisticated statistical methods, to assign a fixed minimum value to a set of pre-selected words, and the like.

Alternatively, the analysis of the sample documents may be performed by a dedicated server; in any case, nothing prevents providing the dictionary already completed with the difficulty indexes of the words.

Similar considerations apply if different formulas are used to update the difficulty indexes according to the local frequencies of use of the words in the current document, or in any other document loaded on the computer (for example, by a percentage of the differences between the frequencies of use and their local values); however, this feature is not strictly necessary, and it may be omitted in some implementations of the proposed solution.

In a different embodiment of the invention, the translations of all the difficult words are displayed (only once) in a dedicated box (close to the original text); more generally, it is possible to output the text and/or the translations in any other way (for example, in printed form, with a text-to-speech system, and the like).

Naturally, the procedure described above for selecting further words and/or translations manually is merely illustrative and must not to be interpreted in a limitative manner; for example, it is possible to provide dedicated commands for selecting further words and/or for deselecting difficult words (thereby obtaining the same result as selecting the corresponding translations).

Likewise, it is possible to update the difficulty indexes according to different algorithms; for example, the difficulty indexes are increasing or decreasing by a predefined percentage thereof (so as to require repeated actions to cross the threshold value). As above, an implementation without one or both of the above-mentioned features is within the scope of the invention.

Alternatively, it is possible to replace the dictionary with any equivalent structure; for example, the translation of each difficult word may be provided at runtime by a dedicated service. In any case, although in the preceding description reference has been made to the translation of documents written in a foreign language, the proposed solution is more generally applicable to facilitate the comprehension of whatever text. For example, the same concepts find application to explain the meaning of the most difficult specialist terms or acronyms of a document.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, embodiments of the present invention lend themselves to be carried out with a hardware structure (for example, integrated in a chip of semiconductor material), or with a combination of software and hardware.

What is claimed is:

1. A method for facilitating computer-assisted comprehension of texts by a user of a data processing system, said method comprising:
   accessing a digital representation of a text, the text including at least one occurrence of each one of a plurality of expressions,
   associating each of the plurality of expressions with a difficulty index that estimates a corresponding comprehension difficulty,
   determining a set of the plurality of expressions that have corresponding difficulty indexes that exceed a threshold value,
   associating each of the set of the plurality of expressions with a corresponding explanation, and
   outputting at least part of the text with an indication of the corresponding explanation of each of the set of the plurality of expressions included in the at least part of the text that is output,
   updating the difficulty index associated with a first of the plurality of expressions in response to detecting selection of the first of the plurality of expressions in the at least part of the text, wherein said updating represents an increase in the estimated comprehension difficulty of the first of the plurality of expressions,
   associating the first of the plurality of expressions with a corresponding explanation, and
   adding an indication of the corresponding explanation of the first of the plurality of expressions to the output of the at least part of the text.

2. The method according to claim 1, wherein associating each expression with the difficulty index comprises:
   determining a frequency of use of the expression, and calculating the difficulty index according to the frequency of use.

3. The method according to claim 2, wherein determining the frequency of use of the expression comprises:
   calculating a percentage of the occurrences of the expression in a set of predefined sample texts.

4. The method according to claim 3, wherein associating each expression with the difficulty index further comprises:
   calculating a further percentage of the occurrences of the expression in the text, and
   updating the frequency of use of the expression according to the further percentage.

5. The method according to claim 1, wherein outputting at least part of the text with the indication of the corresponding explanation of each corresponding selected expression comprises:
   displaying the at least part of the text with the explanation of each expression proximate to each occurrence of the expression.

6. The method according to claim 1, wherein the text is in a first language, and associating each of the set of the plurality of expressions with the corresponding explanation comprises:
   using a translation in a second language of the expression from a dictionary.

7. A method for facilitating computer-assisted comprehension of texts by a user of a data processing system, said method comprising:
   accessing a digital representation of a text, the text including at least one occurrence of each one of a plurality of expressions,
   associating each of the plurality of expressions with a difficulty index that estimates a corresponding comprehension difficulty,
   determining a set of the plurality of expressions that have corresponding difficulty indexes that exceed a threshold value,
   associating each of the set of the plurality of expressions with a corresponding explanation, and
   updating the difficulty index associated with a first of the set of expressions in response to detecting deselection of the first of the set of expressions, wherein said updating represents a decrease in the estimated comprehension difficulty of the first of the set of expressions, and
   removing the corresponding explanation of the first expression from the output of the at least part of the text.

8. A machine-readable storage device having stored therein a plurality of instructions for facilitating computer-assisted comprehension of texts, the plurality of instructions executable by a machine, wherein said plurality of instructions when executed cause said machine to perform operations comprising:
   providing a digital representation of a text, the text including at least one occurrence of each one of a plurality of expressions,
   associating each expression with a difficulty index indicative of a corresponding comprehension difficulty,
   selecting a set of the expressions according to a comparison of the corresponding difficulty indexes with a threshold value, associating each selected expression with a corresponding explanation, and outputting at least part of the text with an indication of the explanation of each corresponding selected expression, updating the difficulty index associated with a first of the plurality of expressions in response to detecting selection of the first of the plurality of expressions in the at least part of the text, wherein said updating represents an increase in the estimated comprehension difficulty of the first of the plurality of expressions, associating the first of the plurality of expressions with a corresponding explanation, and adding an indication of the corresponding explanation of the first of the plurality of expressions to the output of the at least part of the text.

9. The machine-readable storage device of claim 8, wherein the operation of associating each expression with the difficulty index comprises:

determining a frequency of use of the expression, and calculating the difficulty index according to the frequency of use.

10. The machine-readable storage device of claim 9, wherein said operation of determining the frequency of use of the expression comprises:

calculating a percentage of the occurrences of the expression in a set of predefined sample texts.

11. The machine-readable storage device of claim 10, wherein said operation of associating each expression with the difficulty index further comprises:

calculating a further percentage of the occurrences of the expression in the text, and updating the frequency of use of the expression according to the further percentage.

12. The machine-readable storage device of claim 8, wherein said operation of outputting at least part of the text with the indication of the corresponding explanation of each corresponding selected expression comprises:

displaying the at least part of the text with the explanation of each expression proximate to each occurrence of the expression.

13. The machine-readable storage device of claim 8, wherein the operations further comprise:

updating the difficulty index associated with a first of the set of expressions in response to detecting deselection of the first of the set of expressions, wherein said updating represents a decrease in the estimated comprehension difficulty of the first of the set of expressions, and removing the corresponding explanation of the first expression from the output of the at least part of the text.

14. An apparatus for facilitating computer-assisted comprehension of texts, the apparatus comprising:

a microprocessor; and machine-readable storage medium coupled with the microprocessor, the machine-readable storage medium encoded with instructions executable by the microprocessor, the instructions configured to;

determine a plurality of expressions in a document presented in a document viewing application, wherein the document includes at least one occurrence of each of the plurality of expressions;

calculate a difficulty index for each of the plurality of expressions based, at least in part, on frequency of occurrence of the expression in the document, wherein a lower frequency of occurrence estimates a greater comprehension difficulty;

determine a set of the plurality of expressions that have difficulty indices that exceed a threshold value;

associate each of the set of the plurality of expressions with a corresponding explanation; and supply for display an indication of the corresponding explanation of each of the set of the plurality of expressions in a part of the document being displayed;

determine a frequency of occurrence of a second plurality of expressions in a plurality of sample documents, wherein each of the second plurality of expressions occurs at least once in the plurality of sample documents;

calculate an initial difficulty index, for each of the second plurality of expressions, that estimates comprehension difficulty for each of the second plurality of expressions, wherein the initial difficult index is calculated based, at least in part, on the frequency of occurrence of the second plurality of expressions in the plurality of sample documents; and wherein the instructions to calculate the difficulty index for each of the plurality of expressions comprises instructions to update the initial difficulty index, for each of those of the plurality of expressions also in the second plurality of expressions, based on the frequency of occurrence of the expression in the document.

15. The apparatus of claim 14, wherein the corresponding explanation comprises at least one of a translation, a synonym, and a definition.

16. The apparatus of claim 14, wherein the instructions to associate each of the set of the plurality of expressions with the corresponding explanation comprises instructions to access at least one of a dictionary and a translation service.

* * * * *